US012211457B1

(12) United States Patent
Chappalli et al.

(10) Patent No.: US 12,211,457 B1
(45) Date of Patent: Jan. 28, 2025

(54) DYNAMIC QUANTUM DOT COLOR SHIFT COMPENSATION SYSTEMS AND METHODS

(71) Applicant: Apple Inc., Cupertino, CA (US)

(72) Inventors: Mahesh B Chappalli, San Jose, CA (US); Alexey Kornienko, Watford (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/475,077

(22) Filed: Sep. 26, 2023

(51) Int. Cl.
*G09G 3/34* (2006.01)
*G09G 3/32* (2016.01)

(52) U.S. Cl.
CPC ............. *G09G 3/3413* (2013.01); *G09G 3/32* (2013.01); *G09G 2320/0242* (2013.01); *G09G 2320/0626* (2013.01)

(58) Field of Classification Search
CPC ................... G09G 3/3413; G09G 3/32; G09G 2320/0242; G09G 2320/0626
See application file for complete search history.

(56) References Cited

U.S. PATENT DOCUMENTS

| | | | |
|---|---|---|---|
| 8,436,388 B2 | 5/2013 | Lim et al. | |
| 9,267,664 B2 | 2/2016 | Chen et al. | |
| 10,802,341 B2 | 10/2020 | Kim et al. | |
| 11,244,985 B2 | 2/2022 | Han et al. | |
| 11,532,650 B2 | 12/2022 | Yamazaki et al. | |
| 2019/0049777 A1 | 2/2019 | Li | |
| 2021/0018671 A1 | 1/2021 | Makaigaito et al. | |
| 2021/0027693 A1* | 1/2021 | Mandle | G02B 5/201 |
| 2021/0327367 A1* | 10/2021 | An | G09G 3/3685 |
| 2021/0408418 A1* | 12/2021 | Park | H10K 59/12 |
| 2023/0104432 A1 | 4/2023 | Nakajima et al. | |
| 2023/0317018 A1* | 10/2023 | Pyun | G09G 3/3233 345/204 |

FOREIGN PATENT DOCUMENTS

| | | | |
|---|---|---|---|
| CN | 105355182 B * | 8/2018 | |
| WO | 2011130718 A2 | 10/2011 | |

* cited by examiner

*Primary Examiner* — Julie Anne Watko
(74) *Attorney, Agent, or Firm* — Fletcher Yoder P.C.

(57) ABSTRACT

A device may include an electronic display having multiple illuminators that generate light at a first wavelength and a quantum dot layer that converts a portion of the light from the first wavelength to a second wavelength. The first wavelength may vary based on a brightness level of the illuminator, and the amount of light generated by the illuminator that is converted to the second wavelength may vary based on the first wavelength. The electronic display may also include a display pixel to regulate the light emitted from the electronic display at a pixel location based on compensated image data. The device may also include image processing circuitry to determine a luminance contribution to the light from the illuminator for the pixel location, determine per color component compensation values based on the luminance contribution, and generate the compensated image data based on the per color component compensation values.

20 Claims, 9 Drawing Sheets

DYNAMIC QUANTUM DOT COLOR SHIFT COMPENSATION SYSTEMS AND METHODS

BACKGROUND

The present disclosure relates generally to image processing and, more particularly, to compensating for a color shift associated with changes in backlight brightness.

Electronic devices often use one or more electronic displays to present visual information such as text, still images, and/or video by displaying one or more images. For example, such electronic devices may include computers, mobile phones, portable media devices, tablets, televisions, virtual-reality headsets, and vehicle dashboards, among many others. To display an image, an electronic display may control light emission of its display pixels based at least in part on corresponding image data.

In other words, an image to be displayed may be represented by image data defining luminance values for pixels of the display, and the pixels may emit light that, in the aggregate, form the image. For example, one or more backlights may generate light for several different pixels, and each pixel may allow a portion of the generated light to be emitted based on a luminance value of the image data corresponding to the pixel. However, in some scenarios, the color of the light generated by a backlight may vary at different brightness levels, which may cause undesired visual artifacts such as discolorations to appear.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electronic display may include one or more backlights that provide light to multiple pixels. Using the light generated by the backlight, pixels may control the luminance output that is emitted from the electronic display per color component to regulate the amount and/or color of light emitted according to image data. In some embodiments, the brightness of the backlight may be modulated to adjust the overall brightness of the display or a portion thereof. However, in some scenarios, changing the brightness of the backlight may lead to a color shift in the generated light. As such, the change in color of the backlight may cause the luminance levels for one or more color components to be different from the corresponding image data, leading to visible image artifacts (e.g., discolorations). In particular, the backlight of a quantum dot display panel may generate different color light at different brightness levels.

A quantum dot backlight may include multiple illuminators (e.g., light emitting diodes (LEDs)) that produce light at a particular color. Additionally, the quantum dot backlight may include one or more quantum dot layers that change a portion of light generated by the illuminators into different color light (e.g., different wavelengths of light). Together, the generated light and the converted light may provide a balanced (e.g., white) combined light with a known (e.g., expected) spectrum that can be regulated (e.g., via pixels programmed via image data) to display an image.

Additionally, in some embodiments, different brightness levels may be achieved by increasing or decreasing the luminance output of the illuminators by changing the power (e.g., current and/or voltage) provided thereto. However, the output color (e.g., wavelength) of the illuminators may be different at different brightness levels, such as achieved by applying different amounts of current thereto. Furthermore, the quantum dot layers may be sensitive to changes in the generated light such that the amounts (e.g., intensities) of converted light may change with the wavelength of the generated light. As such, the spectrum (e.g., intensity vs. color component/wavelength) of the combined light output from the quantum dot backlight may be different at different brightness levels. In other words, the color of the quantum dot backlight may shift based on the brightness level.

In some embodiments, image processing circuitry such as a color shift compensation block may compensate for the different output colors of the backlight at different brightness levels. The color shift compensation block may increase and/or decrease the relative values of the red, blue, and/or green pixel values of the image data to compensate for the different color combined light of the quantum dot backlight. For example, the color shift associated with an increase in brightness may increase the converted red and green color components of the combined light relative to the generated blue light, which may give the generated light of the backlight an increased yellowish hue. As such, the color shift compensation block may determine how much color shift is exhibited at a pixel location and compensate the image data (e.g., by increasing a blue component and/or by decreasing the red and green components) such that perceivable artifacts, such as discolorations are reduced or eliminated.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
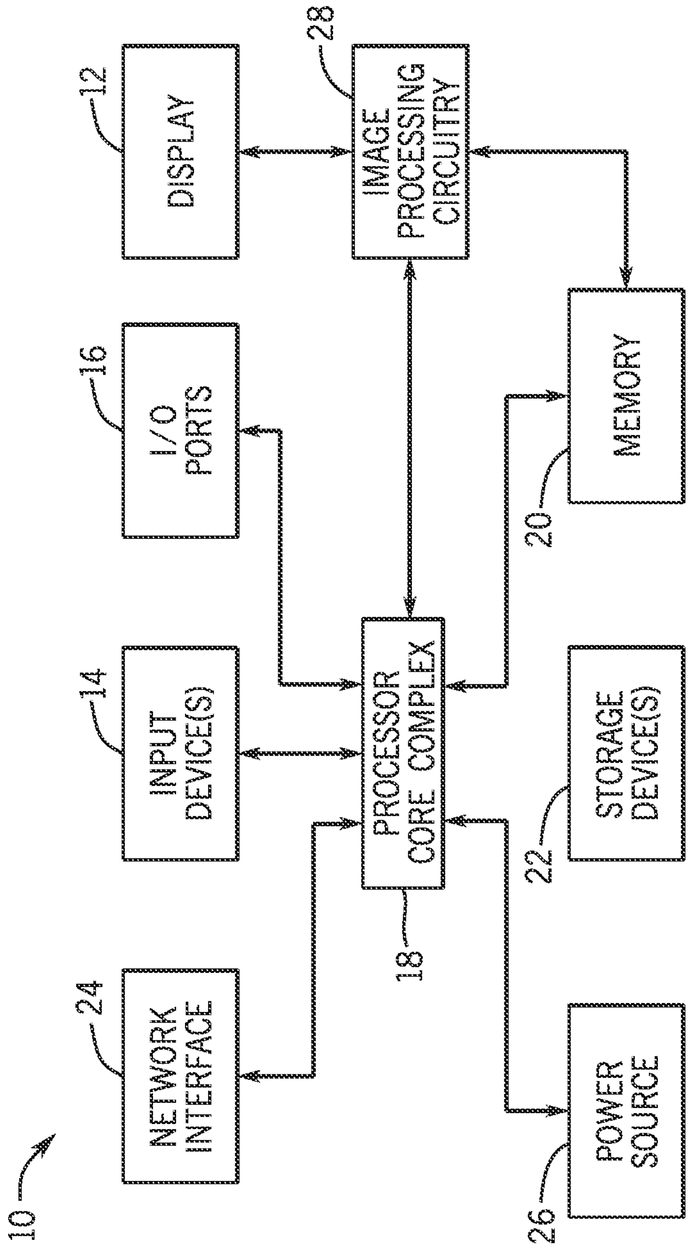
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Electronic devices often use electronic displays to present visual information. Such electronic devices may include computers, mobile phones, portable media devices, tablets, televisions, virtual-reality headsets, and vehicle dashboards, among many others. To display an image, an electronic display controls the luminance (and, as a consequence, the color) of its display pixels based on corresponding image data received at a particular resolution. For example, an image data source may provide image data as a stream of pixel data, in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., XYZ, YCbCr, YUV, etc.), grayscale (e.g., gray level), or other color basis. It should be appreciated that a luma channel, as disclosed herein, may encompass linear, non-linear, and/or gamma-corrected luminance values.

Additionally, the image data may be processed to account for one or more physical or digital effects associated with displaying the image data. For example, image data may be compensated for pixel aging (e.g., burn-in compensation), cross-talk between electrodes within the electronic device, transitions from previously displayed image data (e.g., pixel drive compensation), warps, contrast control, and/or other factors that may cause distortions or artifacts perceivable to a viewer.

In some embodiments, the electronic display may include one or more backlights or other illuminators that provide light to multiple pixels. For example, the electronic display may include a single backlight, multiple backlights controlled together, or multiple backlights controlled individually (e.g., according to location on the electronic display and/or according to color component). Using the light generated by the backlight, pixels may control the luminance output that is emitted from the electronic display per color component to regulate the amount and/or color of light emitted according to image data. As used herein, the term "backlight" may refer to a single illuminator or multiple illuminators working in conjunction with one another, controlled individually or in one or more groups, to provide light to pixels of an electronic display.

In some embodiments, the brightness of the backlight may be modulated to adjust the overall brightness of the display or a portion thereof. However, in some scenarios, changing the brightness of the backlight may lead to a color shift in the generated light. As such, the change in color of the backlight may cause the luminance levels for one or more color components to be different from the corresponding image data, leading to visible image artifacts (e.g., discolorations). In particular, the backlight of a quantum dot display panel may generate different color light at different brightness levels.

A quantum dot backlight may include multiple illuminators (e.g., light emitting diodes (LEDs)) that produce light at a particular color. For example, in some embodiments, the illuminators may generate blue light, such as at a particular wavelength (e.g., 450 nanometers (nm) plus or minus 1 nm, plus or minus 2 nm, plus or minus 5 nm, plus or minus 10 nm, plus or minus 25 nm and so on). Additionally, the quantum dot backlight may include one or more quantum dot layers that change a portion of light generated by the illuminators into different color light (e.g., different wavelengths of light). For example, a quantum dot layer may utilize semiconductor crystals (e.g., nanocrystals) to change a portion of the blue generated light into light of different colors, such as red (e.g., 630 nm plus or minus 1 nm, plus or minus 2 nm, plus or minus 5 nm, plus or minus 10 nm, plus or minus 25 nm and so on) and green (e.g., 530 nm plus or minus 1 nm, plus or minus 2 nm, plus or minus 5 nm, plus or minus 10 nm, plus or minus 25 nm and so on). Together, the generated light and the portions of converted light may provide a balanced (e.g., white) combined light with a known (e.g., expected) spectrum that can be regulated (e.g., via pixels programmed via image data) to display an image.

Additionally, in some embodiments, different brightness levels may be achieved by increasing or decreasing the luminance output of the illuminators by changing the power (e.g., current and/or voltage) provided thereto. However, the output color (e.g., wavelength) of the illuminators may be different (e.g., by up to 0.5 nm, up to 1 nm, up to 2 nm, up to 5 nm, up to 10 nm, etc.) at different brightness levels (e.g., associated with different currents). Furthermore, the quantum dot layers may be sensitive to changes in the generated light such that the amounts (e.g., intensities) of converted light may change with the wavelength of the generated light. As such, the spectrum (e.g., intensity vs. color component/wavelength) of the combined light output from the quantum dot backlight may be different at different brightness levels.

In other words, the color of the quantum dot backlight may shift based on the brightness level. As should be appreciated, the illuminators (e.g., the color and wavelength thereof) and the relative changes in wavelength by the quantum dot layer(s) may depend on implementation, and the present techniques may be utilized with any suitable quantum dot display panel exhibiting color shifts at different brightness levels.

Embodiments of the present disclosure may include image processing circuitry such as a color shift compensation block to compensate for the different output colors of the backlight at different brightness levels. The color shift compensation block may increase and/or decrease the relative values of the red, blue, and/or green pixel values of the image data to compensate for the different color combined light of the quantum dot backlight. For example, the color shift associated with an increase in brightness may increase the converted red and green color components of the combined light relative to the generated blue light, which may give the generated light of the backlight an increased yellowish hue. As such, the color shift compensation block may determine how much color shift is exhibited at a pixel location and compensate the image data (e.g., by increasing a blue component and/or by decreasing the red and green components) such that the color shift is less or not perceivable (e.g., the emitted light from the display panel is indicative of the desired image).

With the foregoing in mind, FIG. 1 is an example electronic device 10 with an electronic display 12 having independently controlled color component illuminators (e.g., projectors, backlights, etc.). As described in more detail below, the electronic device 10 may be any suitable electronic device, such as a computer, a mobile phone, a portable media device, a tablet, a television, a virtual-reality headset, a wearable device such as a watch, a vehicle dashboard, or the like. Thus, it should be noted that FIG. 1 is merely one example of a particular implementation and is intended to illustrate the types of components that may be present in an electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Moreover, the image processing circuitry 28 (e.g., a graphics processing unit, a display image processing pipeline, etc.) may be included in the processor core complex 18 or be implemented separately.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable logic arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) (e.g., of an operating system or computer program), an application interface, text, a still image, and/or video content. The electronic display 12 may include a display panel with one or more display pixels to facilitate displaying images. Additionally, each display pixel may represent one of the sub-pixels that control the luminance of a color component (e.g., red, green, or blue). As used herein, a display pixel may refer to a collection of sub-pixels (e.g., red, green, and blue subpixels) or may refer to a single sub-pixel.

As described above, the electronic display 12 may display an image by controlling the luminance output (e.g., light emission) of the sub-pixels based on corresponding image data. In some embodiments, pixel or image data may be generated by an image source, such as the processor core complex 18, a graphics processing unit (GPU), or an image sensor (e.g., camera). Additionally, in some embodiments, image data may be received from another electronic device 10, for example, via the network interface 24 and/or an I/O port 16. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
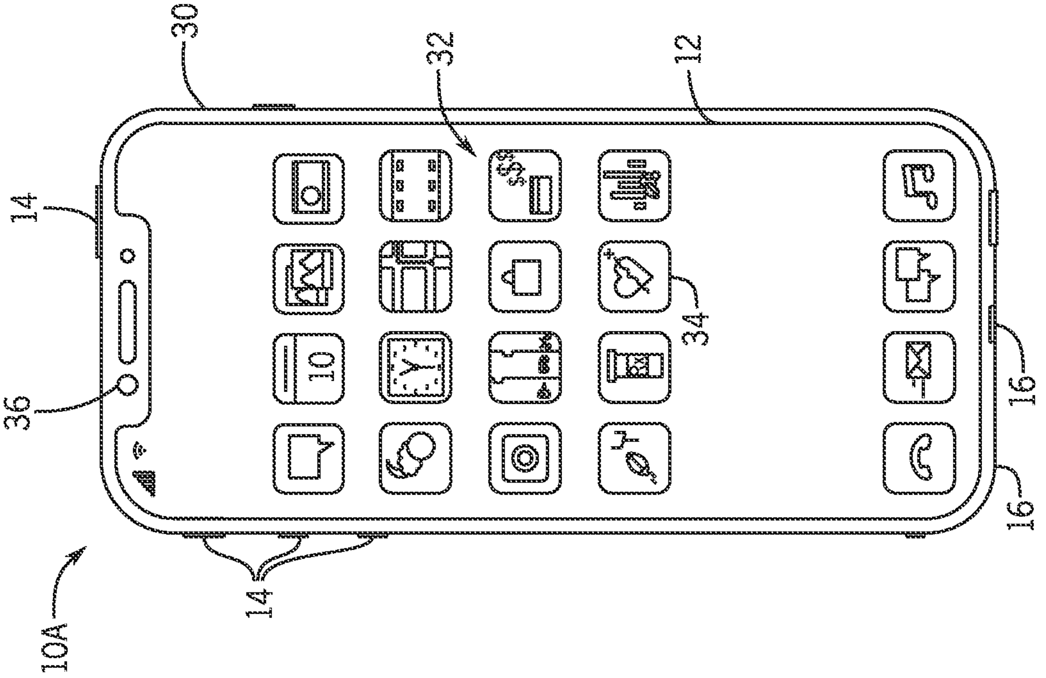
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smartphone, such as an IPHONE® model available from Apple Inc.

The handheld device 10A may include an enclosure 30 (e.g., housing) to, for example, protect interior components from physical damage and/or shield them from electromagnetic interference. The enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Input devices 14 may be accessed through openings in the enclosure 30. Moreover, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30. Additionally, the electronic device may include one or more cameras 36 to capture pictures or video. In some embodiments, a camera 36 may be used in conjunction with a virtual reality or augmented reality visualization on the electronic display 12.

Figure 3:
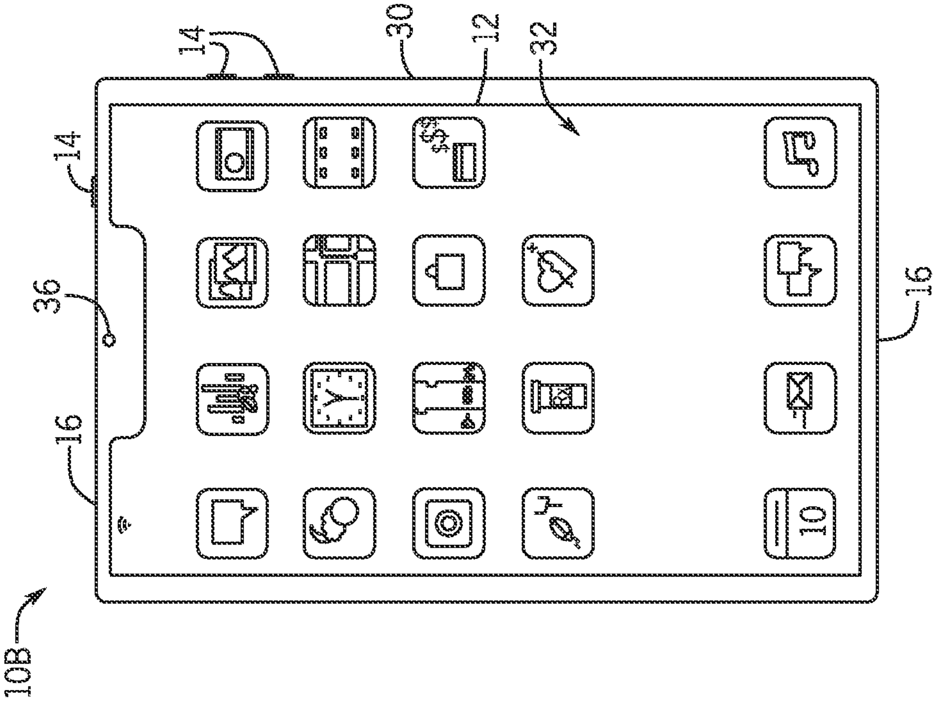
FIG. 3 is another example of the electronic device of FIG. 1 in the form of a tablet device, in accordance with an embodiment.
Figure 4:
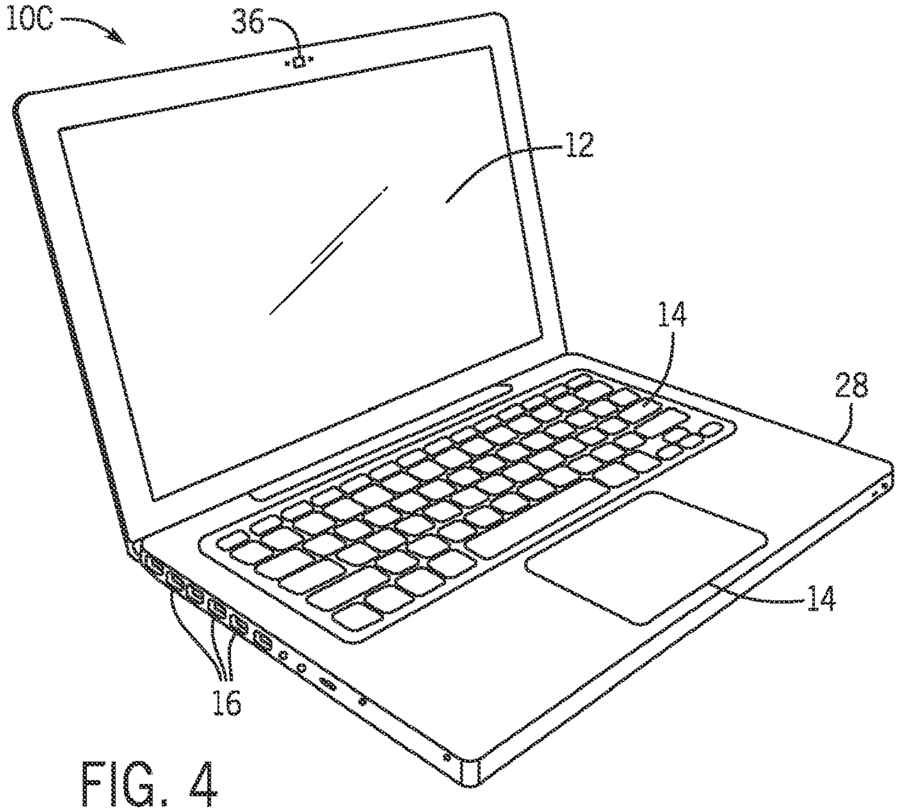
FIG. 4 is another example of the electronic device of FIG. 1 in the form of a computer, in accordance with an embodiment.
Figure 5:
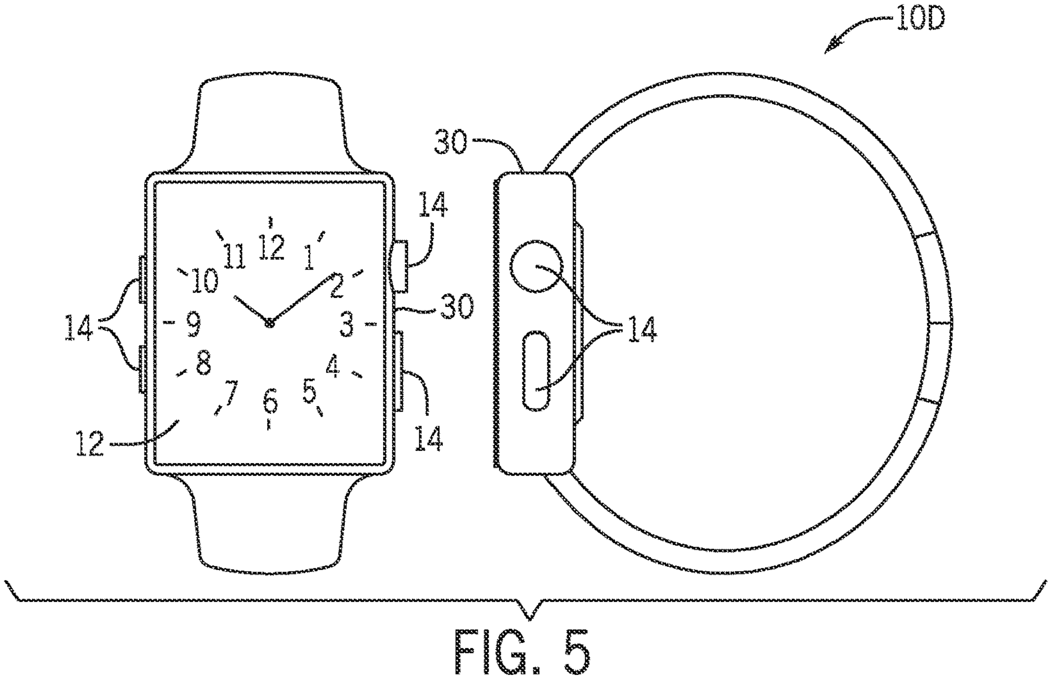
FIG. 5 is another example of the electronic device of FIG. 1 in the form of a watch, in accordance with an embodiment.

Another example of a suitable electronic device 10, specifically a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Figure 6:
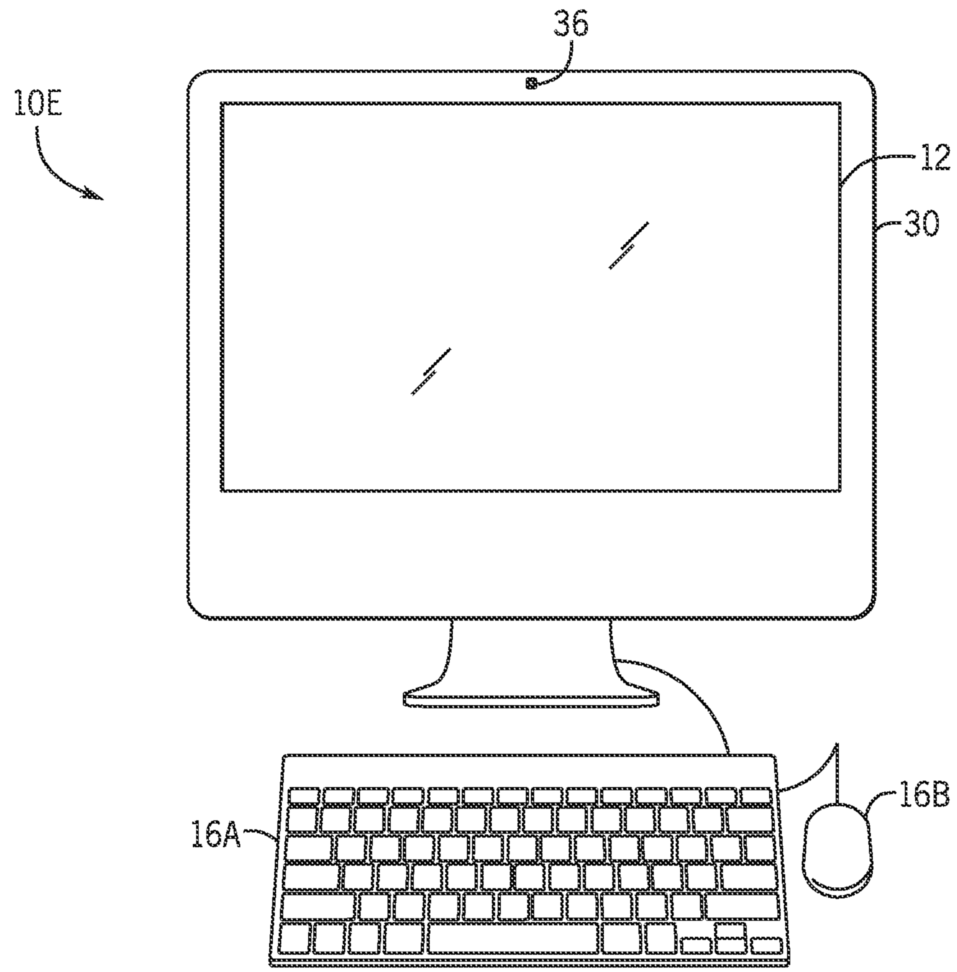
FIG. 6 is another example of the electronic device of FIG. 1 in the form of a computer, in accordance with an embodiment.

Turning to FIG. 6, a computer 10E may represent another embodiment of the electronic device 10 of FIG. 1. The computer 10E may be any suitable computer, such as a desktop computer, a server, or a notebook computer, but may also be a standalone media player or video gaming machine. By way of example, the computer 10E may be an iMac®, a MacBook®, or other similar device by Apple Inc. of Cupertino, California. It should be noted that the computer 10E may also represent a personal computer (PC) by another manufacturer. A similar enclosure 30 may be provided to protect and enclose internal components of the computer 10E, such as the electronic display 12. In certain embodiments, a user of the computer 10E may interact with the computer 10E using various peripheral input devices 14, such as a keyboard 14A or mouse 14B, which may connect to the computer 10E.

As described above, the electronic display 12 may display images based at least in part on image data. Before being used to display a corresponding image on the electronic display 12, the image data may be processed, for example, via the image processing circuitry 28. In general, the image processing circuitry 28 may process the image data for display on one or more electronic displays 12. For example, the image processing circuitry 28 may include a display pipeline, memory-to-memory scaler and rotator (MSR) circuitry, warp compensation circuitry, or additional hardware or software means for processing image data. The image data may be processed by the image processing circuitry 28 to reduce or eliminate image artifacts, compensate for one or more different software or hardware related effects, and/or format the image data for display on one or more electronic displays 12. As should be appreciated, the present techniques may be implemented in standalone circuitry, software, and/or firmware, and may be considered a part of, separate from, and/or parallel with a display pipeline or MSR circuitry.

Figure 7:
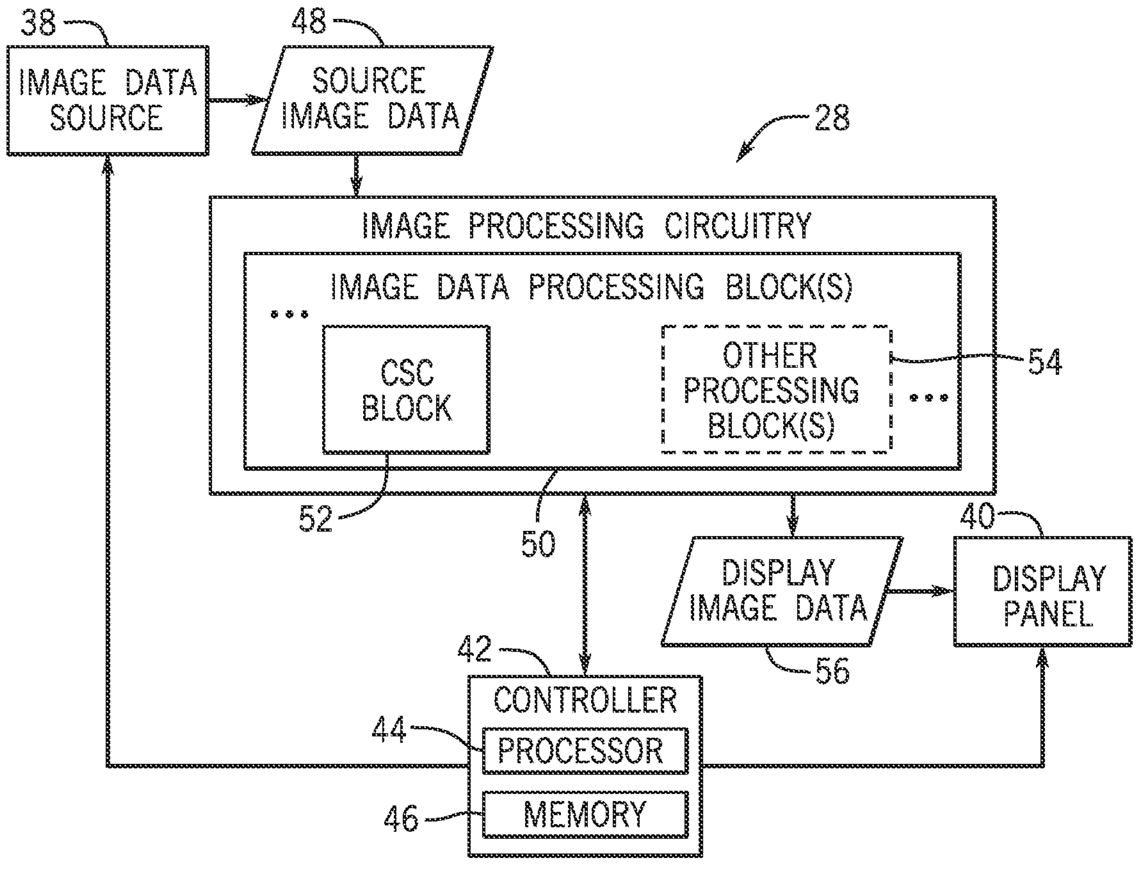
FIG. 7 is a block diagram of the image processing circuitry of FIG. 1 including a color shift compensation (CSC) block, in accordance with an embodiment.

To help illustrate, a portion of the electronic device 10, including image processing circuitry 28, is shown in FIG. 7. The image processing circuitry 28 may be implemented in the electronic device 10, in the electronic display 12, or a combination thereof. For example, the image processing circuitry 28 may be included in the processor core complex 18, a timing controller (TCON) in the electronic display 12, or any combination thereof. As should be appreciated, although image processing is discussed herein as being performed via a number of image data processing blocks, embodiments may include general purpose and/or dedicated hardware or software components to carry out the techniques discussed herein.

The electronic device 10 may also include an image data source 38, a display panel 40, and/or a controller 42 in communication with the image processing circuitry 28. In some embodiments, the display panel 40 of the electronic display 12 may be a reflective technology display, a liquid crystal display (LCD), or any other suitable type of display panel 40. In some embodiments, the controller 42 may control operation of the image processing circuitry 28, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 28 may receive source image data 48 corresponding to a desired image to be displayed on the electronic display 12 from the image data source 38. The source image data 48 may indicate target characteristics (e.g., pixel data) corresponding to the desired image using any suitable source format, such as an RGB format, an αRGB format, a YCbCr format, and/or the like. Moreover, the source image data may be fixed or floating point and be of any suitable bit-depth. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 28 may operate to process source image data 48 received from the image data source 38. The image data source 38 may include captured images from cameras 36, images stored in memory, graphics generated by the processor core complex 18, or a combination thereof. Additionally, the image processing circuitry 28 may include one or more sets of image data processing blocks 50 (e.g., circuitry, modules, or processing stages) such as a color shift compensation (CSC) block 52. As should be appreciated, multiple other processing blocks 54 may also be incorporated into the image processing circuitry 28, such as a color management block, a dither block, a pixel contrast control (PCC) block, a burn-in compensation (BIC) block, a scaling/rotation block, etc. before and/or after the CSC block 52. The image data processing blocks 50 may receive and process source image data 48 and output display image data 56 in a format (e.g., digital format and/or resolution) interpretable by the display panel 40. Further, the functions (e.g., operations) performed by the image processing circuitry 28 may be divided between various image data processing blocks 50, and, while the term "block" is used herein, there may or may not be a logical or physical separation between the image data processing blocks 50.

As discussed further herein, in some embodiments, the CSC block 52 may compensate image data for color shifts associated with brightness changes to the electronic display 12. As should be appreciated, a brightness setting may define a global luminance output of the electronic display 12. Indeed, while display pixels of an electronic display 12 vary the luminance and/or color outputs therefrom depending on the image data, the brightness setting (e.g., a display brightness value (DBV), global brightness setting, etc.) may regulate the overall brightness (e.g., total luminance output) of the electronic display 12 by increasing or decreasing an amount of light generated by a backlight of the display panel 40. For example, the voltages and/or currents provided to illuminators of the backlight may be increased to increase the brightness level of electronic display 12, such as based on the brightness setting. As should be appreciated, the brightness setting may be obtained/determined based on numerous factors such as but not limited to ambient lighting (e.g., received via an ambient light sensor), time of day, panel age, and/or a user setting.

Figure 8:
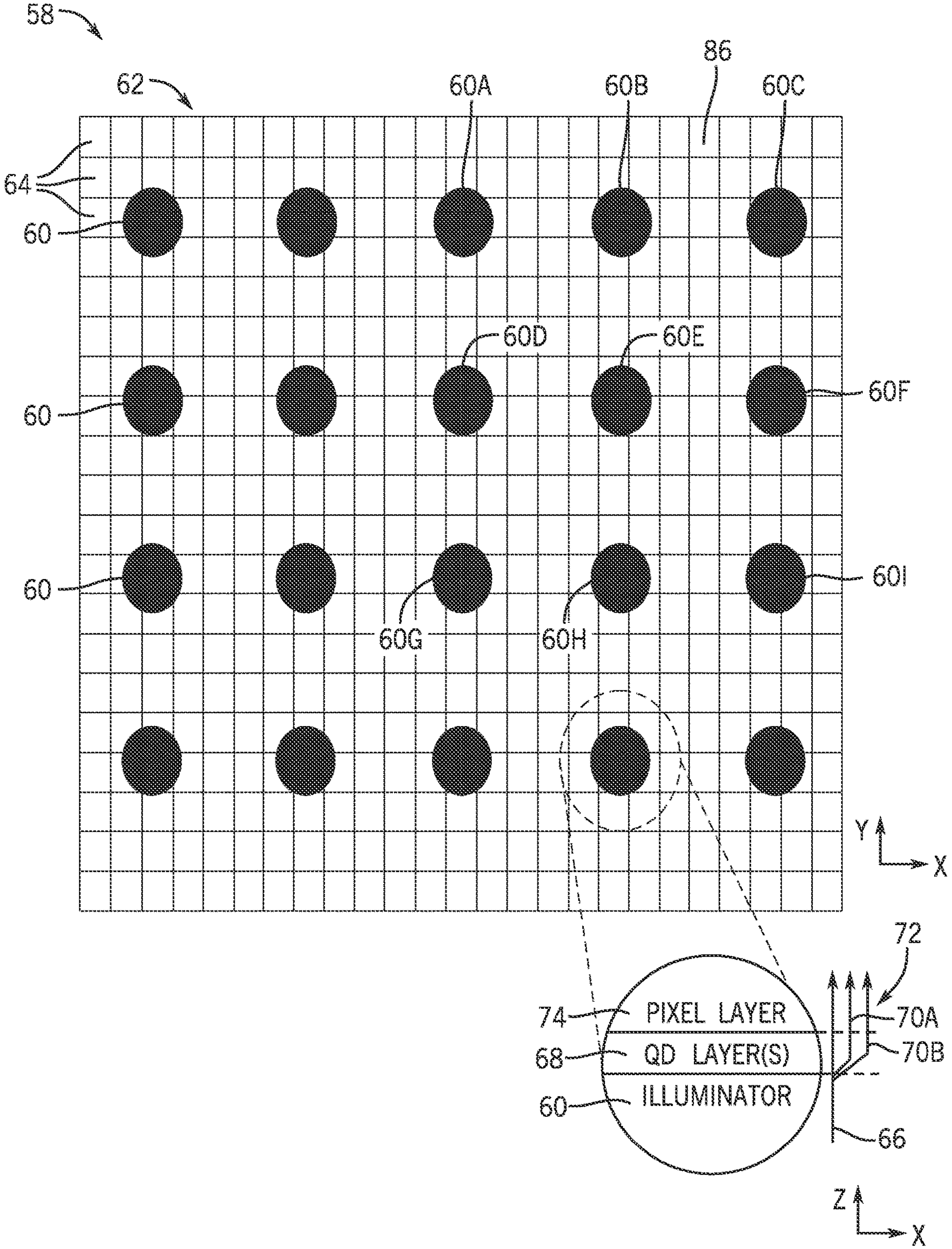
FIG. 8 is a schematic diagram of a portion of a quantum dot display panel, in accordance with an embodiment.

In some embodiments, the electronic display 12 may include a quantum dot display panel 58 with multiple illuminators 60 (e.g., light emitting diodes (LEDs)) that produce light for a grid 62 of pixel locations 64, as shown in FIG. 8. As should be appreciated, the number, layout, and relative sizes of the illuminators 60 and pixel locations 64 of the grid 62 are shown for illustrative purposes only and are, as such, non-limiting. In general, a quantum dot display panel 58 may utilize multiple illuminators 60 distributed across the display panel 40 to produce generated light 66 at a particular color. For example, in some embodiments, the generated light 66 may be blue light at a particular wavelength (e.g., 450 nanometers (nm) plus or minus 1 nm, plus or minus 2 nm, plus or minus 5 nm, plus or minus 10 nm, plus or minus 25 nm and so on). Additionally, the quantum dot display panel 58 may include one or more quantum dot layers 68 that change a portion of generated light 66 of the illuminators 60 into different color light (e.g., different wavelengths of light). For example, a quantum dot layer 68 may utilize semiconductor crystals (e.g., nanocrystals) to change a portion of blue generated light 66 into different colors, such as red converted light 70A (e.g., 630 nm plus or minus 1 nm, plus or minus 2 nm, plus or minus 5 nm, plus or minus 10 nm, plus or minus 25 nm and so on) and green converted light 70B (e.g., 530 nm plus or minus 1 nm, plus or minus 2 nm, plus or minus 5 nm, plus or minus 10 nm, plus or minus 25 nm and so on), cumulatively converted light 70. Together, the generated light 66 and converted light 70 may provide a balanced (e.g., white) combined light 72 with a known (e.g., expected) spectrum that can be regulated via a pixel layer 74 (e.g., of display pixels) based on the display image data 56. The pixel layer 74 may include display pixels that regulate a transmissivity of different color components. Moreover, as used herein, a display pixel may refer to a single color component display pixel or a group of sub-pixels including multiple color component display pixels (e.g., a red display pixel, a blue display pixel, and a green display pixel). Furthermore, as used herein, the quantum dot display panel 58 includes a quantum dot backlight including the illuminators 60 and the quantum dot layer(s) 68. As should be appreciated, the different converted lights 70 (e.g., red converted light 70A and green converted light 70B) may be produced in a single quantum dot layer 68 or in individual quantum dot layers 68. Moreover, as should be appreciated, the illuminator 60, quantum dot layer 68, and pixel layer 74 of FIG. 8 are shown as functional layers and may or may not be linearly stacked, and there may or may not be physical distinctions therebetween. For example, one or more layers, such as the pixel layer 74 and the quantum dot layer 68, may be formed together.

Figure 9:
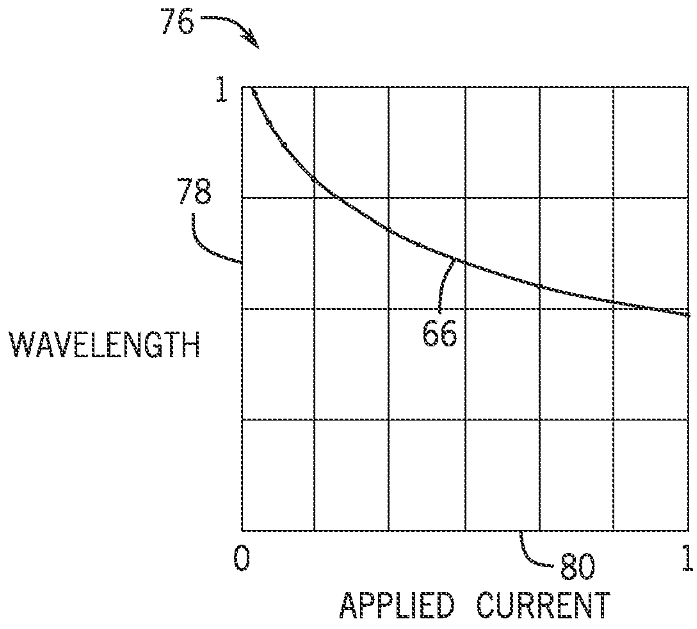
FIG. 9 is a graph of changes in wavelength of light generated by a quantum dot illuminator with respect to the current applied thereto, in accordance with an embodiment.

Furthermore, in some embodiments, different brightness levels may be achieved by increasing or decreasing the luminance output of the illuminators 60 by changing the power (e.g., current and/or voltage) provided thereto. However, the color (e.g., wavelength) of the generated light 66 from the illuminators 60 may be different (e.g., by up to 0.5 nm, up to 1 nm, up to 2 nm, up to 5 nm, up to 10 nm, up to 25 nm, and so on) at different brightness levels. For example, FIG. 9 is a graph 76 of the wavelength 78 of the generated light 66 from an illuminator 60 relative to an applied current 80 to the illuminator 60. As should be appreciated, the wavelength 78 and the applied current 80 of the graph 76 are normalized and may be indicative of any color and/or type of illuminator 60. Indeed, as the applied current 80 is increased, such as to increase the brightness level (e.g., luminance output), the wavelength 78 of the generated light 66 may also change. As such, the change in brightness level may alter the color of the combined light 72 produced by the backlight.

Figure 10:
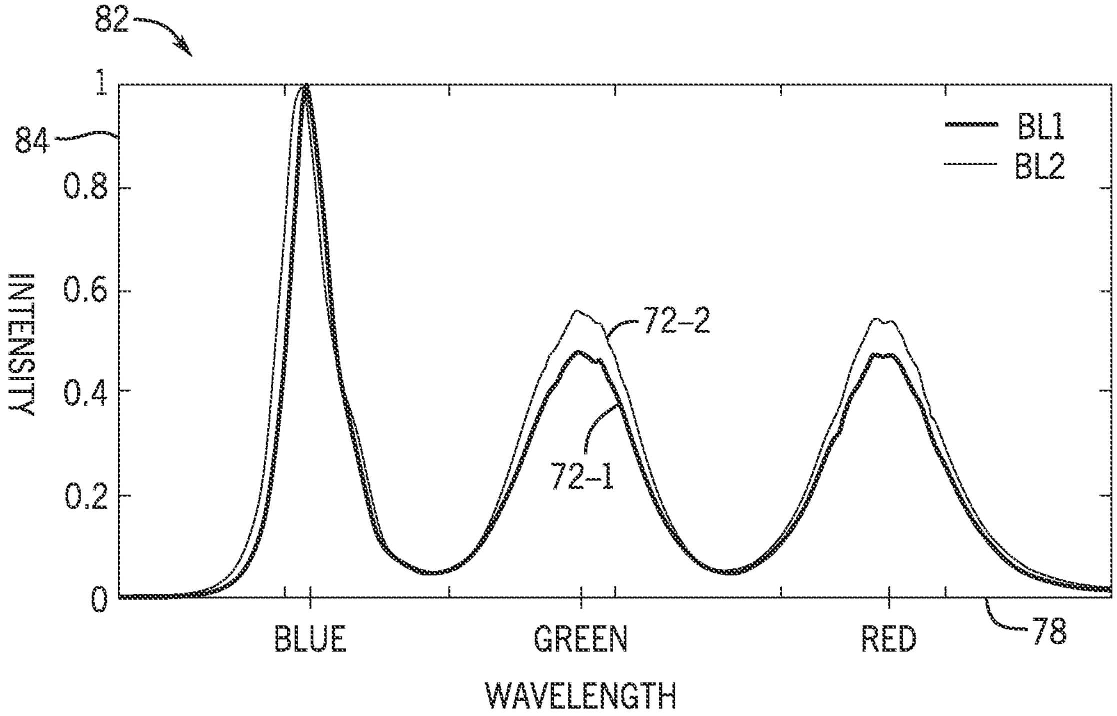
FIG. 10 is a graph of the intensities of different wavelengths of light produced by a quantum dot backlight at different brightnesses, in accordance with an embodiment.

Furthermore, the quantum dot layer(s) 68 may be sensitive to changes in the generated light 66 such that the amounts (e.g., intensities) of converted light 70 may change with the wavelength of the generated light 66. To help illustrate, FIG. 10 is a graph 82 of the relative intensity 84 of the wavelengths 78 of the combined light 72-1 at a first brightness level (BL1) and the combined light 72-2 a second brightness level (BL2). Indeed, the spectrum (e.g., intensity 84 vs. color component/wavelength 78) of the combined light 72 output from the quantum dot backlight may be different at different brightness levels. In other words, the color of the quantum dot backlight may shift based on the brightness level. As should be appreciated, the illuminators 60 (e.g., the color and wavelength thereof) and the relative changes in wavelength 78 by the quantum dot layer(s) 68 may depend on implementation, and the present techniques may be utilized with any suitable quantum dot display panel 58 exhibiting color shifts (e.g., color differences) at different brightness levels.

As discussed above, the brightness of the backlight may be modulated to adjust the overall brightness of the electronic display 12 or a portion thereof. However, changing the brightness of the backlight may lead to a color shift in the generated light 66 and/or the intensities 84 of the converted light 70 and, therefore, the combined light 72. The change in color of the combined light 72, if uncompensated, may cause visible image artifacts (e.g., discolorations). As such, in some embodiments, a portion of the image processing circuitry 28 such as the color shift compensation block 52 may compensate for the different output colors of the quantum dot backlight at different brightness levels. Indeed, the color shift compensation block 52 may increase and/or decrease the relative values of the red, blue, and/or green pixel values of the image data (e.g., display image data 56) to compensate for the different color combined light 72 of the quantum dot backlight. For example, the color shift associated with an increase in brightness may increase the red converted light 70A and the green converted light 70B color components of the combined light 72 relative to the blue generated light 66, which may increase/produce a yellowish hue in the combined light 72. As such, the color shift compensation block 52 may determine how much color shift is exhibited at a pixel location 64 and compensate the image data (e.g., by increasing a blue component and/or by decreasing the red and green components) such that the color shift is less or not perceivable.

Returning briefly to FIG. 8, In some embodiments, the backlight of the quantum dot display panel 58 may include multiple illuminators 60 controlled together (e.g., in one or more groups) or controlled individually (e.g., according to location on the electronic display 12). For example, illuminators 60 along edges of the electronic display 12 may be maintained at a reduced brightness level relative to illuminators 60 closer to the center of the electronic display 12, such as part of vignetting or other effect. Furthermore, a pixel location of interest 86 (e.g., corresponding to a display pixel of the pixel layer 74) may receive light contributions from multiple illuminators 60 (e.g., illuminators 60A-60I). In other words, the combined light 72 regulated by a pixel at a pixel location of interest 86 may be sourced (e.g., directly and/or indirectly via the quantum dot layer(s) 68) from multiple illuminators 60. As such, the color of the combined light 72 received from the multiple different illuminators 60 may or may not be uniform. For example, illuminators 60 closer to a pixel location of interest 86, such as illuminator 60E, may provide a higher contribution of combined light 72 to the pixel location of interest 86 than an illuminator 60 further from the pixel location of interest 86, such as illuminator 60G. In some embodiments, contributions from different illuminators 60 may be considered separately and/or in an aggregate when generating compensations to image data for shifts in the color of the combined light 72 at a pixel location of interest 86.

Figure 11:
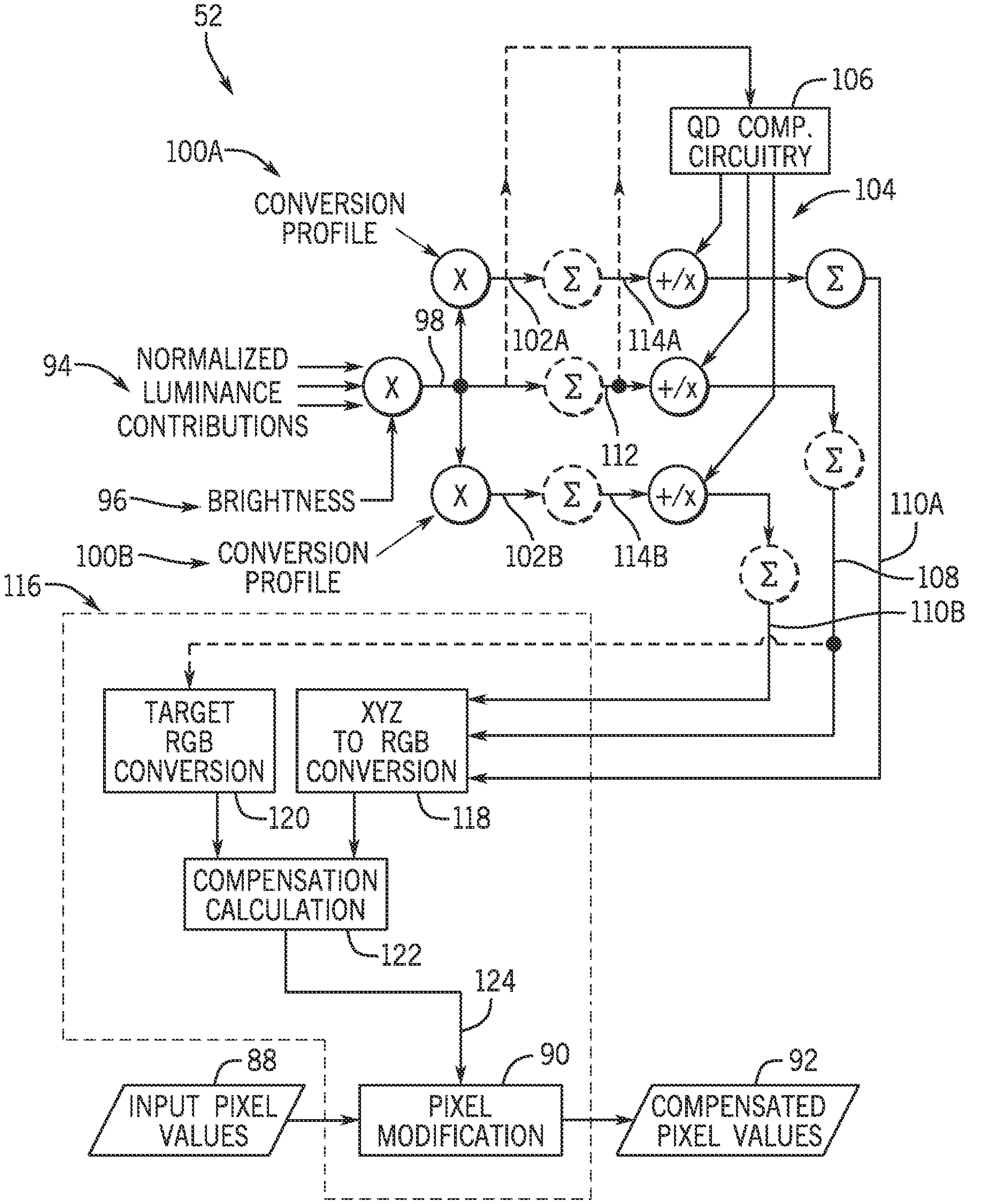
FIG. 11 is a schematic diagram of the CSC block of FIG. 7, in accordance with an embodiment.

To help illustrate, FIG. 11 is a schematic diagram of a portion of the color shift compensation block 52 that receives input pixel values 88, implements a pixel modification 90 to compensate for color shifts of the quantum dot backlight, and outputs compensated pixel values 92. In some embodiments, the color shift compensation block 52 may obtain the luminance contributions 94 of one or more illuminators 60 for a pixel location of interest 86. For example, the luminance contributions 94 may be measures of how much light (e.g., combined light 72) is attributable to different illuminators 60, such as based on the relative locations of the illuminators 60 and the pixel location of interest 86. Moreover, in some embodiments, the luminance contributions 94 may be normalized to sum to one for the pixel location of interest 86. In some embodiments, the luminance contributions 94 may include contributions from all of the illuminators 60 of the quantum dot display panel 58 or a subset thereof. For example, such a subset may include 9 illuminators, 16 illuminators, 108 illuminators, or any suitable number of illuminators 60 depending on implementation. Moreover, illuminators 60 included in the subset may be those that contribute greater than a threshold amount of luminance to the pixel location of interest 86, within a threshold distance from the pixel location of interest 86, and/or be fixed relative to the portion of the grid 62 surrounding the pixel location of interest 86.

The luminance contributions 94 (e.g., normalized luminance contributions) based on locations of the illuminators 60 may be multiplied by their corresponding brightness 96 to achieve the luma contribution values 98 (e.g., Y channel color components of a chromatic color space such as XYZ, YUV, YCbCr, etc.) of each illuminator 60. Additionally, conversion profiles 100A and 100B (cumulatively 100) of the quantum dot layer(s) 68 that convert portions of the generated light 66 to converted light 70 may be used to obtain the chromatic channel contributions 102A and 102B, respectively, to the combined light 72 of the illuminators 60. As discussed above, the illuminators 60 may be controlled separately (e.g., independently or in groups) and, therefore, may have different brightnesses 96. As such, each illuminator 60 may have separate color shifts contributing to the combined light 72 at the pixel location of interest 86. As such, in some embodiments, the luma contribution value 98 of each illuminator 60 may be used to obtain color corrections 104 (e.g., compensations) to the luma contribution contribution values 98 and chromatic channel contributions 102A and 102B. For example, quantum dot compensation circuitry 106 may utilize an algorithm, look-up-table, or other technique to generate the color corrections 104 based on the luma contribution values 98 of the illuminators 60. The color corrections 104 for each color component (e.g., luma contribution value 98 and chromatic channel contributions 102A and 102B) of each illuminator 60 may be combined (e.g., multiplied as a gain and/or added as an offset) with the respective luma contribution values 98 and chromatic channel contributions 102A and 102B of the illuminators to achieve the corrected (e.g., estimated to be the actual output) luma contribution values and chromatic channel contributions for each illuminator 60, and the corrected contributions of each illuminator 60 may be summed to generate a corrected total luma value 108 and corrected total chromatic components 110A and 110B, the combination of which is estimated to be the actual color of the combined light 72 at the pixel location of interest 86.

As should be appreciated, obtaining color corrections 104 for each illuminator 60 assumed to have a contribution at the pixel location of interest 86 may include performing such calculations for many (e.g., greater than 3, greater than 20, greater than 100, etc.) illuminators 60, which may be hardware and/or software resource intensive. In some embodiments, the luma contribution values 98 and chromatic channel contributions 102A and 102B may be respectively summed, prior to computing the color corrections 104, to obtain a total luma value 112 and total chromatic components 114A and 114B. The color corrections 104 may then be determined (e.g., via the quantum dot compensation circuitry 106) based on the total luma value 112. By performing the sum before computing the color corrections 104, the number of color corrections 104 and associated computations may be reduced for increased efficiency. The color corrections 104 based on the total luma value 112 may be combined (e.g., multiplied as a gain and/or added as an offset) with the respective total luma value 112 and total chromatic components 114A and 114B to obtain the corrected total luma value 108 and the corrected total chromatic components 110A and 110B.

Based on the corrected color (e.g., defined by the corrected total luma value 108 and the corrected total chromatic components 110A and 110B) of the quantum dot backlight at the pixel location of interest 86, the color shift compensation block 52 may determine the pixel modification 90 to the input pixel values 88, such as via pixel compensation circuitry 116. For example, in some embodiments, the corrected total luma value 108 and the corrected total chromatic components 110A and 110B may be converted to an RGB color space (e.g., via an XYZ to RBG conversion 118) or other color space of the input pixel values 88. Moreover, in some embodiments, the target RGB color (e.g., the estimated color of the combined light 72 at the corrected total luma value 108 if no color shift occurred) may be determined (e.g., via a target RGB conversion 120). The target RGB color and corrected color of the combined light 72 in RGB format may be used (e.g., via a compensation calculation 122) to determine pixel corrections 124 (e.g., pixel compensations to the image data) for each of the RGB color components of the input pixel values 88. As should be appreciated, while discussed herein as in the RGB color space, any suitable color space, such as the color space of the input pixel values 88 may be utilized (e.g., converted to and used for calculating the pixel corrections 124). Moreover, the pixel corrections 124 may be calculated as gains and/or offsets to be combined (e.g., multiplied and/or added, respectively) during pixel modification 90 to generate the compensated pixel values 92.

As should be appreciated, portions of the pixel compensation circuitry 116 are shown as examples, and additional, fewer, and/or different conversions and calculations may be used therein to determine the pixel corrections 124. Moreover, in some embodiments, one or more aspects of the color shift compensation block 52 may be combined and/or implemented together. For example, the quantum dot compensation circuitry 106 and pixel compensation circuitry 116 may be implemented together (e.g., in hardware, software, or a combination thereof) such that the pixel corrections 124 are determined based on the total luma value 112 or the collection of multiple luma value contributions 98 for the pixel location of interest 86.

Figure 12:
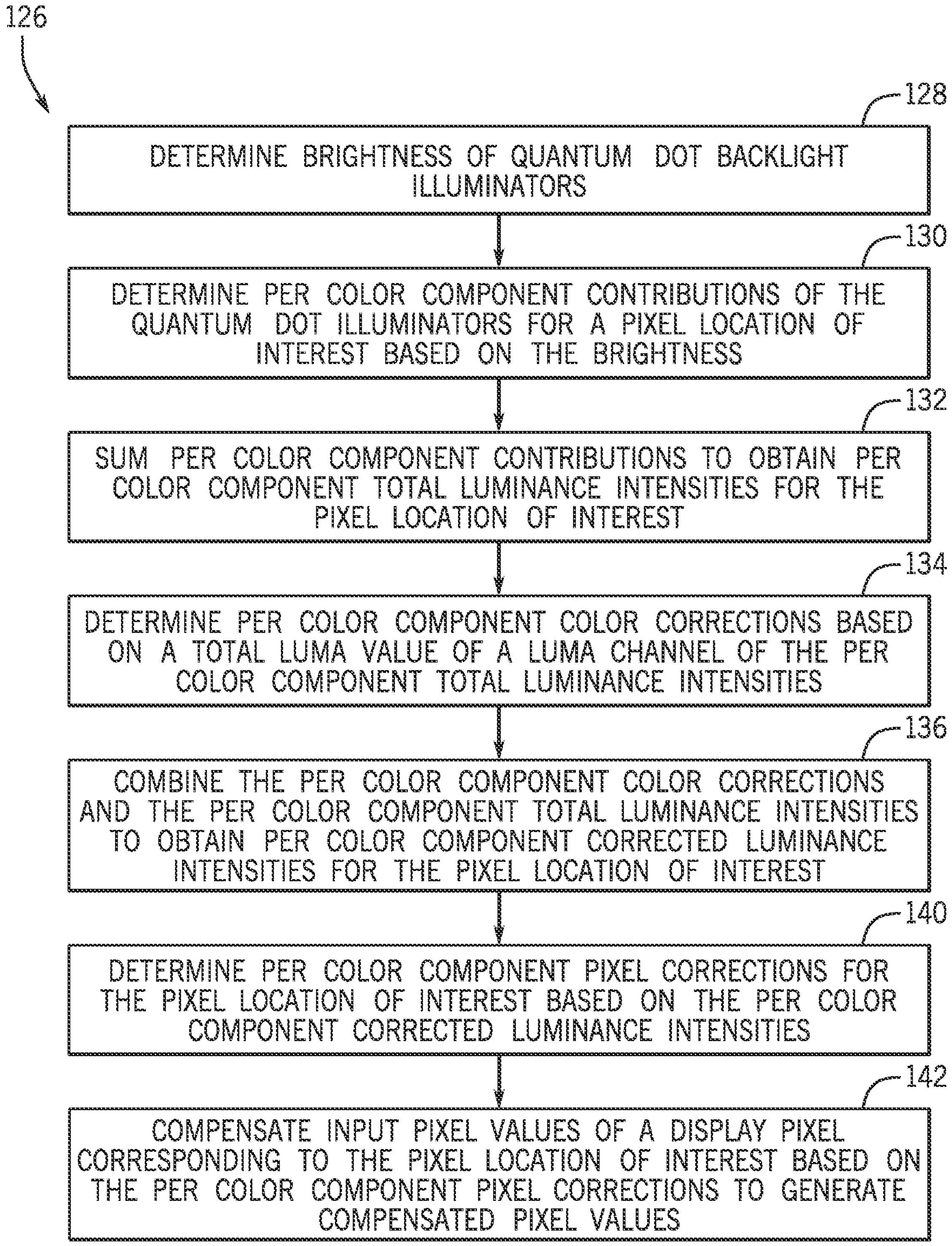
FIG. 12 is a flowchart of an example process for compensating input pixel values to account for a color shift associated with different quantum dot backlight brightnesses, in accordance with an embodiment.

To help further illustrate, FIG. 12 is a flowchart 126 of an example process for compensating input pixel values 88 to account for a color shift associated with different quantum dot backlight brightnesses. In some embodiments, the color shift compensation block 52 may determine brightnesses of illuminators 60 of a quantum dot backlight of a quantum dot display panel 58 (process block 128). Additionally, the color shift compensation block 52 may determine per color component (e.g., in an XYZ or other chromatic color space) contributions (e.g., luma contributions values 98 and chromatic channel contributions 102) of the quantum dot illuminators 60 for a pixel location of interest 86 based on the brightnesses (process block 130). For example, normalized luminance contributions 94 may be used along with the brightnesses of individual illuminators 60 to determine luma contribution values 98, and the luma contribution values 98 may be used along with conversion profiles 100 to determine chromatic channel contributions 102. Additionally, the per color component contributions (e.g., luma contributions values 98 and chromatic channel contributions 102) may be summed, respectively, to obtain per color component total luminance intensities (e.g., a total luma value 112 and total chromatic components 114) for the pixel location of interest 86 (process block 132). Additionally, the color shift compensation block 52 may determine per color component color corrections 104 based on a total luma value 112 of a luma channel of the per color component total luminance intensities (process block 134). The per color component color corrections 104 and the per color component total luminance intensities (e.g., total luma value 112 and total chromatic components 114) may be combined (e.g., via summation or multiplication) to obtain per color component corrected luminance intensities (e.g., corrected total luma value 108 and the corrected total chromatic components 110) for the pixel location of interest 86 (process block 136). As should be appreciated, the per color component corrected luminance intensities may, cumulatively, be indicative of the estimated color of the combined light 72 at the pixel location of interest 86. Based on the per color component corrected luminance intensities, per color component pixel corrections 124 (e.g., compensations) may be determined for the pixel location of interest 86 (process block 140). Moreover, input pixel values 88 for a display pixel corresponding to the pixel location of interest 86 may be compensated based on the per color component pixel corrections 124 to generate compensated pixel values 92 (process block 142).

As discussed herein, a color shift compensation block 52 of image processing circuitry 28 may reduce the likelihood of image artifacts (e.g., discoloration) due to color shifts in a quantum dot backlight at different brightnesses. Although the above flowchart 126 is shown in a given order, in certain embodiments, process/decision blocks may be reordered, altered, deleted, and/or occur simultaneously. Additionally, the flowchart 126 is given as an illustrative tool and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. A device comprising:

an electronic display comprising:

a plurality of illuminators configured to generate light at a first wavelength, wherein the first wavelength of an illuminator of the plurality of illuminators varies based on a brightness level of the illuminator;

a quantum dot layer configured to convert a portion of the light from the first wavelength to a second wavelength, wherein an amount of the portion of the light generated by the illuminator converted to the second wavelength varies based on the first wavelength; and a display pixel configured to regulate the light emitted from the electronic display at a pixel location based on compensated image data; and image processing circuitry configured to:

determine a luminance contribution to the light from the illuminator for the pixel location;

determine per color component compensation values based on the luminance contribution; and generate the compensated image data based on the per color component compensation values.

2. The device of claim 1, wherein the image processing circuitry is configured to:

determine a plurality of luminance contributions to the light from two or more illuminators of the plurality of illuminators for the pixel location, wherein the two or more illuminators comprises the illuminator;

determine a summed luminance contribution of the two or more illuminators by summing at least a portion of the plurality of luminance contributions; and determine the per color component compensation values based on the summed luminance contribution.

3. The device of claim 2, wherein the image processing circuitry is configured to:

determine a luminance compensation based on the summed luminance contribution;

combine the luminance compensation and the summed luminance contribution to generate a corrected luminance contribution; and determine the per color component compensation values based on the corrected luminance contribution.

4. The device of claim 2, wherein the plurality of luminance contributions comprises a first component contribution, a second component contribution, and a third component contribution for each illuminator of the two or more illuminators, wherein summing at least the portion of the plurality of luminance contributions comprises summing the first component contribution of each of the two or more illuminators.

5. The device of claim 4, wherein the first component contribution comprises a luma component contribution, the second component contribution comprises a first chromatic component contribution, and the third component contribution comprises a second chromatic component contribution.

6. The device of claim 1, wherein the first wavelength comprises blue visible light.

7. The device of claim 6, wherein the second wavelength comprises red visible light or green visible light.

8. The device of claim 1, wherein the image processing circuitry comprises a hardware pipeline having dedicated color shift compensation circuitry configured to generate, at least in part, the compensated image data.

9. The device of claim 1, wherein the plurality of illuminators comprises a plurality of light emitting diodes (LEDs) configured to generate the light at the first wavelength.

10. The device of claim 9, wherein the quantum dot layer comprises a silicon microcrystal configured to convert the portion of the light from the first wavelength to the second wavelength.

11. Image processing circuitry having color shift compensation circuitry configured to:

receive pixel values corresponding to a pixel of a quantum dot display panel at a pixel location;

determine a plurality of luminance contributions to light from a respective plurality of illuminators of a quantum dot backlight of the quantum dot display panel for the pixel location;

determine one or more color compensation values based on the plurality of luminance contributions;

determine a compensated color of the light from the quantum dot backlight at the pixel location based on the one or more color compensation values;

determine pixel compensation values based on the compensated color of the light from the quantum dot backlight at the pixel location; and modify the pixel values based on the pixel compensation values.

12. The image processing circuitry of claim 11, wherein determining the one or more color compensation values comprises:

summing at least a portion of the plurality of luminance contributions to generate a total luma value, wherein the portion of the plurality of luminance contributions comprises luminance contributions to a luma component of the light from the quantum dot backlight at the pixel location; and determining the one or more color compensation values based on the total luma value.

13. The image processing circuitry of claim 12, wherein determining the one or more color compensation values comprises referencing a look-up-table indexed by the total luma value.

14. The image processing circuitry of claim 12, wherein the one or more color compensation values comprise a luma compensation value, a first chromatic compensation value, and a second chromatic compensation value.

15. The image processing circuitry of claim 14, wherein the compensated color of the light comprises a compensated luma component based on the luma compensation value and the total luma value, a first compensated chromatic component based on the first chromatic compensation value, and a second compensated chromatic component based on the second chromatic compensation value.

16. The image processing circuitry of claim 11, wherein determining the one or more color compensation values comprises determining a color compensation value for each color component of each illuminator of the plurality of illuminators, and wherein the color shift compensation circuitry is configured to:

combine the color compensation value for each color component of each illuminator of the plurality of illuminators with respective components of the plurality of luminance contributions to generate a set of compensated luminance contributions for each illuminator of the plurality of illuminators, wherein the set of compensated luminance contributions for each illuminator comprises a compensated luma contribution value, a first compensated chromatic contribution value, and a second compensated chromatic contribution value; and determine the compensated color based on respective sums of the compensated luma contribution value, the first compensated chromatic contribution value, and the second compensated chromatic contribution value of each of the plurality of illuminators.

17. The image processing circuitry of claim 11, wherein the color shift compensation circuitry is configured to:

convert the compensated color of the light to a color space of the pixel values;

determine a difference between the compensated color of the light and a target color of the light in the color space of the pixel values; and determine the pixel compensation values based on the difference.

18. A non-transitory, machine-readable medium comprising instructions, wherein, when executed by one or more processors, the instructions cause the one or more processors to perform operations or to cause the one or more processors to control image processing circuitry to perform the operations, wherein the operations comprise:

receiving pixel values corresponding to a pixel of a quantum dot display panel at a pixel location;

determining a plurality of luminance contributions to light from a respective plurality of illuminators of a quantum dot backlight of the quantum dot display panel for the pixel location;

determining one or more color compensation values based on the plurality of luminance contributions;

determining a compensated color of the light from the quantum dot backlight at the pixel location based on the one or more color compensation values;

determining pixel compensation values based on the compensated color of the light from the quantum dot backlight at the pixel location; and modifying the pixel values based on the pixel compensation values.

19. The non-transitory, machine-readable medium of claim 18, wherein determining the one or more color compensation values comprises:

summing at least a portion of the plurality of luminance contributions to generate a total luma value, wherein the portion of the plurality of luminance contribution comprises luminance contributions to a luma component of the light from the quantum dot backlight at the pixel location; and determining the one or more color compensation values based on the total luma value.

20. The non-transitory, machine-readable medium of claim 19, wherein determining the plurality of luminance contributions of the plurality of illuminators comprises multiplying normalized contributions to the light from the plurality of illuminators by respective brightnesses of the plurality of illuminators.

* * * * *